(No Model.)

W. A. SCHLEICHER.
SNAP FOR HARNESS.

No. 563,071. Patented June 30, 1896.

WITNESSES

INVENTOR
William A. Schleicher
by his attorneys
Bakewell & Bakewell

UNITED STATES PATENT OFFICE.

WILLIAM A. SCHLEICHER, OF CLEVELAND, OHIO.

SNAP FOR HARNESS.

SPECIFICATION forming part of Letters Patent No. 563,071, dated June 30, 1896.

Application filed February 26, 1896. Serial No. 580,850. (No model.)

*To all whom it may concern:*

Be it known that I, WILLIAM A. SCHLEICHER, of Cleveland, in the county of Cuyahoga and State of Ohio, have invented a new and useful Improvement in Bolt-Snaps for Harness, of which the following is a full, clear, and exact description, reference being had to the accompanying drawings, forming part of this specification, in which—

Figure 1:
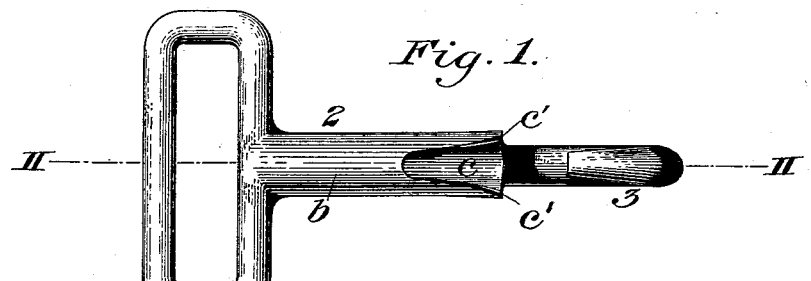
Figure 2:
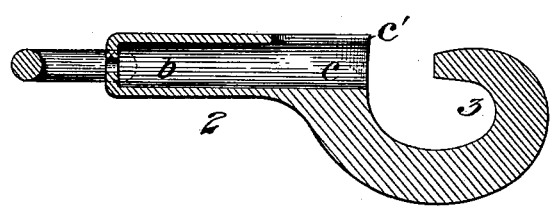
Figure 3:
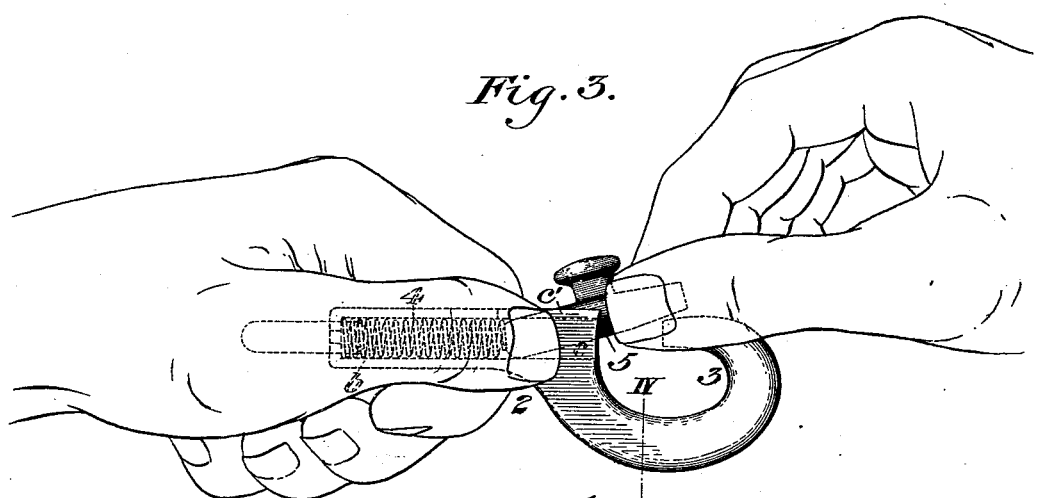
Figure 4:
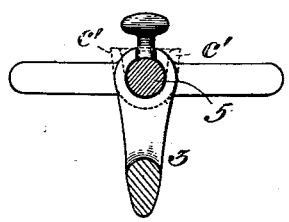

Figure 1 is a top plan view of one of my improved blanks for bolt-snaps before the insertion of the bolt. Fig. 2 is a longitudinal section thereof on the line II II of Fig. 1. Fig. 3 is a view in side elevation illustrating the manner of inserting the bolt and spring into the shank. Fig. 4 is a vertical section of the completed snap, taken as if on the line IV IV of Fig. 3, showing the bolt and hook in vertical section and the end of the shank in elevation. In this figure I show by dotted lines the position of the lips of the shank before they have been bent over the bolt.

The purpose of my invention is to improve the manufacture of snaps for harness by providing a blank which can be made to inclose and retain the bolt without danger of breaking or weakening the body of the snap. To this end my invention consists in a cast snap-blank the rear portion of whose shank is tubular and is closed peripherally, while the front portion is open and has a lip or lips adapted to be bent over the bolt to confine the same, the usual hook being cast integral with the shank, so that a spring may be put in the tubular portion, and a sliding bolt inserted, so that its rear end shall bear against the spring and shall be confined by bending over the lip or lips.

In the manufacture of bolt-snaps according to the mode most commonly practiced, it has been usual to make the hole in the body or shank which is to receive the bolt either closed throughout its entire length, or open throughout its length, and to cast the hook proper on one side. In assembling the parts, the bolt and spring are placed in the hole, and the hook is then bent laterally into position in front of the bolt, thus preventing the latter from escaping from the hole, or where the shank is open throughout its length the open portions have been bent over toward each other. In these operations, as the bending must be done after the snap has been tinned, and as the tinning deprives the metal of much of its malleability, there has always been a large percentage of loss arising from breaking of the hooks and shanks when bending them, and it is the purpose of my invention to provide a snap which, without entailing any other objections, can be cast with the hook portion in the same relative position which it occupies in the finished article, and the parts of which can be assembled readily and quickly. To this end I form the shank of the snap with a hole, the rear portion of which is tubular, closed, or unslotted peripherally, and is adapted to receive the bolt-spring, and the front part of which is cast open and with lips diverging somewhat laterally, so that when the spring is set in the shank it will be confined in the tubular portion, permitting the easy insertion of the bolt, and that the bolt can be adjusted while the hook is in its normal position.

In the drawings, 2 represents the body or shank of the snap, which is cast, as shown in Figs. 1 and 2. The rear portion $b$ is cast with a core hollow and tubular in form, though not necessarily circular in cross-section, since a bolt of square or other form in section may be used; and the front portion $c$ is cast open and with flaring or divergent lips $c'$. The hook 3 is cast in its natural position, with its end directly opposite to the axis of the shank. The parts of the shank and hook having been cast integral in the manner above described, the spring 4 and sliding bolt 5 are set in position in the manner illustrated in Fig. 3. The spring is inserted in the tubular portion $b$ of the shank, which confines it and holds it in position. The bolt is then pushed thereinto against the spring, and the end of the bolt is allowed to bear against the end of the hook, by which means it is held temporarily in place. The divergent lips $c'$ are then bent over upon the bolt, so as to confine it permanently within the shank of the snap, and the article is then completed. Such assembling of the parts is accomplished without bending the hook and in a very simple and easy manner; and as the metal of the shank is bent at the extreme end portion only, there is little danger of breaking the same. The advantages of my invention in this regard are very important and will be appreciated by those skilled in the art familiar with the objections pertaining to snaps of this class constructed as has been common heretofore.

I claim—

1. The herein-described cast blank for bolt-snaps, comprising a shank, the rear portion of which is tubular, and is closed peripherally and the front portion of which is open and has a lip or lips adapted to be bent over the bolt to confine the same, and a hook cast integral with the shank, and having its end in axial alinement therewith, said tubular portion being adapted to receive a spring, and the open front portion being adapted to receive the sliding bolt whose rear end bears against the spring; substantially as described.

2. The herein-described cast blank for bolt-snaps, comprising a shank, the rear portion of which is tubular, and is closed peripherally and the front portion of which is open and has a divergent lip or lips adapted to be bent over the bolt to confine the same, and a hook cast integral with the shank, said tubular portion being adapted to receive a spring, and the open front portion being adapted to receive the sliding bolt whose rear end bears against the spring; substantially as described.

In testimony whereof I have hereunto set my hand.

WILLIAM A. SCHLEICHER.

Witnesses:
CHAS. A. AKERS,
EMIL W. JAITE.